(12) United States Patent (10) Patent No.: US 8,789,094 B1
Singh et al. (45) Date of Patent: Jul. 22, 2014

(54) OPTIMIZING VIRTUAL COLLABORATION SESSIONS FOR MOBILE COMPUTING DEVICES

(75) Inventors: Ujjwal Singh, Palo Alto, CA (US); Nikhyl P. Singhal, Menlo Park, CA (US); Param Reddappagari, Redmond, WA (US); Marcelo Enrique Stockl Cortes, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/424,081

(22) Filed: Mar. 19, 2012

Related U.S. Application Data

(60) Provisional application No. 61/497,923, filed on Jun. 16, 2011.

(51) Int. Cl.
*G06F 3/00* (2006.01)
*G06F 13/00* (2006.01)
*H04N 7/16* (2011.01)
*H04N 7/14* (2006.01)

(52) U.S. Cl.
USPC ......... 725/37; 725/62; 348/14.01; 348/14.02; 348/14.03; 348/14.08; 348/14.09

(58) Field of Classification Search
USPC .......... 348/14.01, 14.02, 14.03, 14.08, 14.09; 709/204–207; 715/733–759; 725/62, 725/37; 345/661
See application file for complete search history.

(56) References Cited

U.S. PATENT DOCUMENTS

| | | | |
|---|---|---|---|
| 5,375,068 A | 12/1994 | Palmer et al. | |
| 5,793,365 A | 8/1998 | Tang et al. | |
| 5,880,731 A | 3/1999 | Liles et al. | |
| 7,016,935 B2 | 3/2006 | Lee et al. | |
| 7,620,902 B2 | 11/2009 | Manion et al. | |
| 7,752,553 B2 | 7/2010 | Pennington et al. | |
| 7,822,809 B2 | 10/2010 | Dhupelia et al. | |
| 7,865,566 B2 | 1/2011 | Ashtekar et al. | |
| 7,984,098 B2 | 7/2011 | Enete et al. | |
| 8,032,470 B1 | 10/2011 | Heidenreich et al. | |
| 8,538,895 B2 | 9/2013 | Appelman et al. | |
| 2001/0048449 A1 | 12/2001 | Baker | |
| 2002/0130904 A1 | 9/2002 | Becker et al. | |
| 2003/0074451 A1 | 4/2003 | Parker et al. | |

(Continued)

OTHER PUBLICATIONS

"Ruby on rails—Implementing an Online Waiting Room," [online]. First Accessed on Oct. 7, 2011. Retrieved from the Interne!: http://stackoverflow.com/questions/2669891/implementing-an-online-waiting-room, 2 pg.

(Continued)

*Primary Examiner* — Pankaj Kumar
*Assistant Examiner* — Alazar Tilahun
(74) *Attorney, Agent, or Firm* — Remarck Law Group PLC

(57) ABSTRACT

Aspects of the present disclosure provide techniques that may optimize a virtual collaboration session for mobile computing devices. In one example, a method includes receiving, using one or more computing devices, a first video stream sent from a first client device using a communication session, and receiving a second video stream sent from a second client device using the communication session. The method may also include receiving a request sent from the first client device using the communication session to select the first video stream as a primary video, and providing a third video stream based at least on the primary video stream and the secondary video stream to the first client device using the communication session, wherein the third video stream includes the primary video stream.

20 Claims, 7 Drawing Sheets

(56) References Cited

U.S. PATENT DOCUMENTS

| | | |
|---|---|---|
| 2004/0186887 A1 | 9/2004 | Galli et al. |
| 2004/0218035 A1 | 11/2004 | Crook |
| 2004/0249811 A1 | 12/2004 | Shostack et al. |
| 2004/0260781 A1 | 12/2004 | Shostack et al. |
| 2005/0273503 A1 | 12/2005 | Carr et al. |
| 2006/0031772 A1 | 2/2006 | Valeski |
| 2006/0098085 A1* | 5/2006 | Nichols et al. ............. 348/14.07 |
| 2006/0176831 A1 | 8/2006 | Greenberg et al. |
| 2006/0182249 A1 | 8/2006 | Archambault et al. |
| 2007/0020603 A1 | 1/2007 | Woulfe |
| 2007/0050452 A1 | 3/2007 | Raju |
| 2007/0071209 A1 | 3/2007 | Horvitz et al. |
| 2007/0169165 A1 | 7/2007 | Crull et al. |
| 2007/0208806 A1 | 9/2007 | Mordecai et al. |
| 2007/0211141 A1* | 9/2007 | Christiansen ............. 348/14.08 |
| 2007/0233291 A1 | 10/2007 | Herde et al. |
| 2007/0299912 A1 | 12/2007 | Sharma et al. |
| 2008/0070697 A1 | 3/2008 | Robinson et al. |
| 2008/0140523 A1 | 6/2008 | Mahoney et al. |
| 2008/0192732 A1 | 8/2008 | Riley et al. |
| 2008/0201638 A1 | 8/2008 | Nair |
| 2008/0209339 A1 | 8/2008 | Macadaan et al. |
| 2008/0209351 A1 | 8/2008 | Macadaan et al. |
| 2008/0222533 A1 | 9/2008 | Hankejh et al. |
| 2008/0260138 A1 | 10/2008 | Chen et al. |
| 2009/0040289 A1* | 2/2009 | Hetherington et al. .... 348/14.12 |
| 2009/0063995 A1 | 3/2009 | Baron et al. |
| 2009/0222742 A1 | 9/2009 | Pelton et al. |
| 2010/0057857 A1 | 3/2010 | Szeto |
| 2010/0082693 A1 | 4/2010 | Hugg et al. |
| 2010/0174783 A1 | 7/2010 | Zarom |
| 2010/0192072 A1 | 7/2010 | Spataro et al. |
| 2010/0203968 A1 | 8/2010 | Gill et al. |
| 2010/0205541 A1 | 8/2010 | Rapaport et al. |
| 2010/0226288 A1 | 9/2010 | Scott et al. |
| 2011/0055309 A1 | 3/2011 | Gibor et al. |
| 2011/0106662 A1 | 5/2011 | Stinchcomb |
| 2011/0107239 A1 | 5/2011 | Adoni et al. |
| 2011/0185057 A1 | 7/2011 | Waugaman et al. |
| 2011/0222466 A1 | 9/2011 | Pance et al. |
| 2011/0269540 A1 | 11/2011 | Gillo et al. |
| 2011/0271205 A1 | 11/2011 | Jones et al. |
| 2011/0300841 A1 | 12/2011 | Archambault et al. |
| 2011/0319175 A1 | 12/2011 | Jensen |

OTHER PUBLICATIONS

"TJN Chat Room—The Jazz Newwork Worldwide," [online]. First Accessed Dec. 5, 2011. Retrieved from the Interne!: http://www.thejazznetworkworldwide.com/group/tjnchatroom, 17 pgs.

Apple, Inc. Using your built-in iSight camera. Nov. 14, 2011. accessed on Aug. 5, 2013 from Internet http://support.apple.com/kb/ht1462. p. 1-2.

Avchat Video Chat "AVChat Video Chat Features, Tons of Features, Insanely Flexible," [online]. First Accessed Aug. 18, 2011. Retrieved from the Interne!: http://avchal.nel/features.php, 4 pgs.

ichat excerpt from http://www.apple.com/macosx/apps/all.html#ichat, downloaded Jul. 11, 2011, 1 p.

Parkes, Skype for iPhone will run in the background with iPhone OS 4. Apr. 8, 2010. The Big Blog [online]. Retrieved from the Internet: http://blogs.skype.com/en/2010/04/skype_for_iphone_will_run_in_t.html.

Roseman et al., TeamRooms: Network Places for Collaboration. 1996. ACM , Computer Supported Cooperative Work '96. p. 325-33.

Weisz et al., "Watching Together: Integrating Text Chat With Video," CHI 2007 Proceedings—Video, Apr. 28- May 3, 2007, San Jose, CA, pp. 877-886.

Wikipedia page SkypeTM , last modified Jul. 10, 2011. 22 pp.

Wikipedia page Tinychat, last modified Jun. 15, 2011, 2 pp.

www.tinychat.com, "Video chat with friends & meet new ones from all around the world—today," downloaded Jul. 11, 2011. 18 pp.

NNRD435158. "Automatically Moderated Group Debate on the Internet." IBM Technical Disclosure Bulletin. Jul. 2000, UK. Issue 435, p. 1299.

* cited by examiner

OPTIMIZING VIRTUAL COLLABORATION SESSIONS FOR MOBILE COMPUTING DEVICES

This application claims the benefit of U.S. Provisional Application No. 61/497,923, filed Jun. 16, 2011, which is assigned to the assignee hereof and hereby expressly incorporated by reference herein.

TECHNICAL FIELD

This disclosure relates to electronic devices, and, in particular, virtual collaboration sessions between electronic devices.

BACKGROUND

A user may socialize with his/her contacts by chatting, watching television or videos, playing games, or engaging in other activities with his/her contacts. In some instances, a user and his/her contacts may not be in the same physical location. Instead, the user and his/her contacts may rely on other mechanisms to socialize, such as talking on the phone, sending email, or text messaging.

SUMMARY

In one example, a method includes receiving, using one or more computing devices, a first video stream sent from a first client device of a plurality of client devices using a communication session and receiving a second video stream from a second client device of the plurality of client devices, wherein the first client device, the second client device, and the one or more computing devices are each communicatively coupled to the communication session. The method further includes receiving, using the one or more computing devices, a request sent from the first client device using the communication session to select the second video stream as a primary video stream. The method further includes providing, using the one or more computing devices, a third video stream based at least on the primary video stream and the secondary video stream to the first client device using the communication session, wherein the third video stream includes the primary video stream.

In another example, a method includes providing, by a first computing device, a first video stream and a still image associated with a second video stream for display on a presence-sensitive screen of the first computing device, wherein the first computing device and a second computing device are each communicatively coupled to a communication session, and wherein the first video stream is received from the second computing device using the communication session. The method further includes detecting a gesture at the presence-sensitive screen of the first computing device, wherein the gesture corresponds to a selection of the second video stream, and providing, by the first computing device, the second video stream and a still image associated with the first video stream for display on the presence-sensitive screen.

In another example, a computer-readable storage medium includes instructions for causing at least one processor of one or more computing devices to perform operations. The operations include receiving a first video stream sent from a first client device of a plurality of client devices using a communication session, and receive a second video stream sent from a second client device of the plurality of client devices using the communication session, wherein the first client device, the second client device, and the one or more computing devices are each communicatively coupled to the communication session. The operations may further include receiving a request sent from the first client device using the communication session to select the second video stream as a primary video stream, and providing a third video stream based at least on the primary video stream and the secondary video stream to the first client device using the communication session, wherein the third video stream includes the primary video stream.

In another example, a computer-readable storage medium includes instructions for causing at least one processor of a first computing device to perform operations. The operations include providing, using the first computing device, a first video stream and a still image associated with a second video stream for display on a presence-sensitive screen of the first computing device, wherein the first computing device and a second computing device are each communicatively coupled to a communication session, and wherein the first video stream is received from the second computing device using the communication session. The operations may further include detecting a gesture at the presence-sensitive screen of the first computing device, wherein the gesture corresponds to a selection of the second video stream, and to provide, using the first computing device, the second video stream and a still image associated with the first video stream for display on the presence-sensitive screen.

In another example, a server includes one or more computing devices that are configured to perform a method. The method includes receiving a first video stream sent from a first client device of a plurality of client devices using a communication session and receiving a second video stream from a second client device of the plurality of client devices, wherein the first client device, the second client device, and the server are each communicatively coupled to the communication session. The method further includes receiving a request sent from the first client device using the communication session to select the second video stream as a primary video stream. The method further includes providing a third video stream based at least on the primary video stream and the secondary video stream to the first client device using the communication session, wherein the third video stream includes the primary video stream.

The details of one or more embodiments are set forth in the accompanying drawings and the description below. Other features, objects, and advantages will be apparent from the description and drawings, and from the claims.

DETAILED DESCRIPTION

Overview

Figure 1:
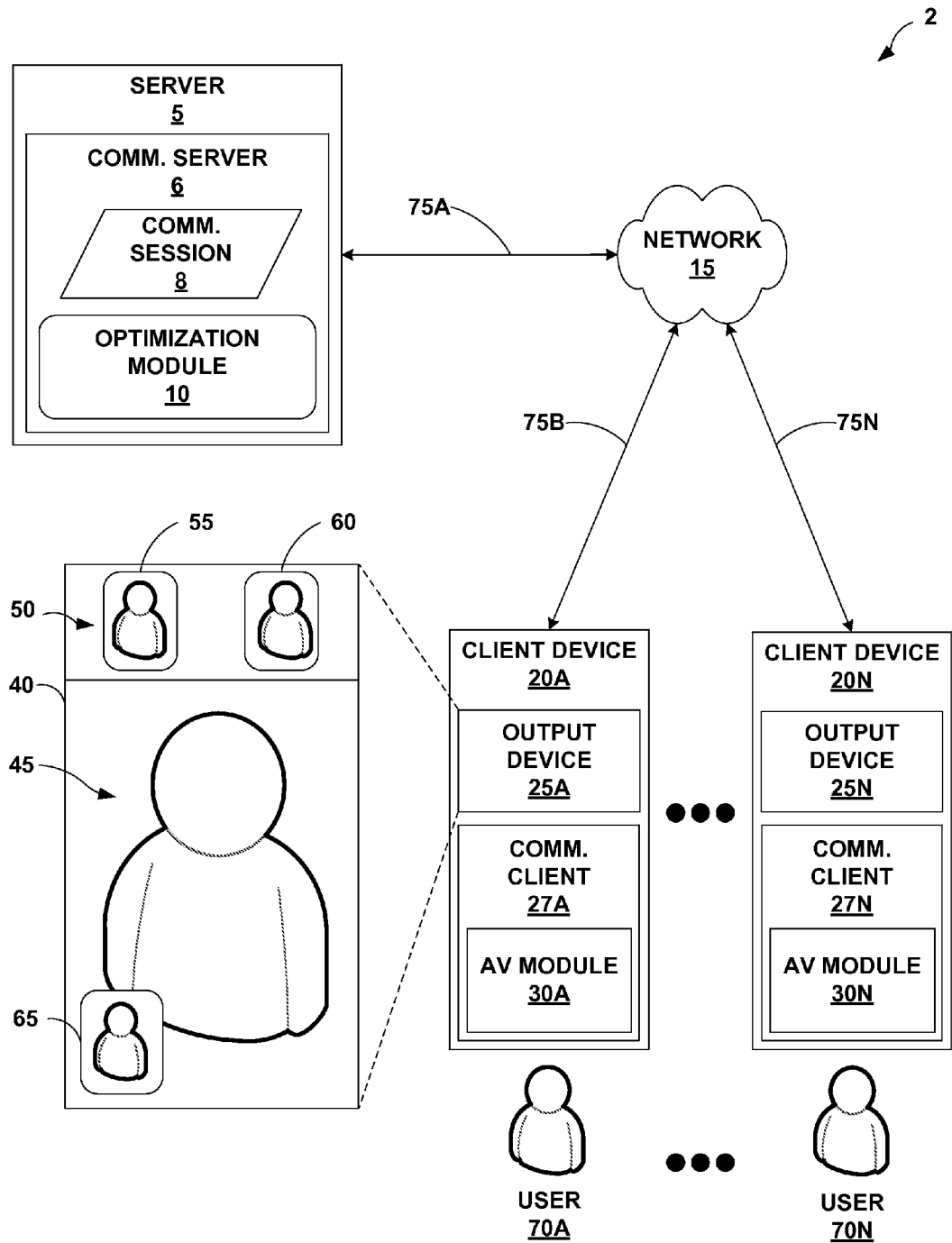
FIG. 1 is a conceptual diagram illustrating a server and one or more client devices, which may participate in a virtual collaboration session that enables communication between users, in accordance with one or more aspects of the present disclosure.

Friends, family members, or other individuals who wish to socialize or otherwise communicate may be dispersed geographically. When dispersed geographically, some individuals may rely on various forms of telephony, text messaging, email, or other forms of communication that support limited forms of socializing. However, these forms of communication may not give users an experience comparable to socializing in person. Techniques of the present disclosure may provide one or more mechanisms for users in different locations to socialize in a shared virtual location (e.g., engage in a "virtual collaboration session"). A virtual collaboration session may enable multiple users to share and watch videos, share and listen to audio streams, play games, participate in video and/or audio chat, collaboratively browse the Internet, or combinations thereof.

Some individuals may prefer to participate in a virtual collaboration session by using a mobile computing device, such as a smartphone operable using a touchscreen. Virtual collaboration sessions may be optimized for display capabilities of a mobile computing device, which may be different from display capabilities of a conventional computing device, such as a desktop or laptop computer. Virtual collaboration sessions may also be optimized to exploit additional resources of a mobile computing device, which a conventional computing device may lack (e.g., front- and rear-facing cameras). Further, virtual collaboration sessions may be optimized for processing capabilities of a mobile computing device, which may, in some cases, be weaker than processing capabilities of a conventional computing device. Optimizing virtual collaboration sessions for the processing capabilities of a mobile computing device may involve additional processing of audio and/or video streams by a server.

Techniques of the present disclosure are directed to optimizing virtual collaboration sessions for mobile computing devices. The virtual collaboration session may include audio and/or video streams of participants included in the virtual collaboration session. The participant devices may send the audio and/or video streams to a server. The server may optimize the audio and/or video streams prior to forwarding the streams to the mobile computing device. For example, the server may combine encoded audio and/or video streams of other participants in the virtual collaboration session into a single stream and send the combined stream to the mobile computing device. If the mobile computing device has insufficient bandwidth to both send an audio and video stream and receive an audio and/or video stream from the server, techniques of the disclosure may enable the mobile computing device to dynamically stop sending the audio and video stream to the server and begin sending an audio stream to the server. Thus, the user may continue to participate in the virtual collaboration session despite the limited available bandwidth.

Techniques of the present disclosure may also enable a mobile computing device to optimize the virtual collaboration session graphical user interface (GUI) for display on a display screen of the mobile computing device. In one example, the mobile computing device may display the video stream of the virtual collaboration session such that one participant is displayed using the majority of the mobile computing device's screen and thumbnail images of other participants are displayed on a remaining portion of the screen. In another embodiment, the mobile computing device displays each virtual collaboration session participant on a separate landing page of the GUI. A user of the mobile computing device may perform a swipe gesture to change the displayed landing page, thereby focusing on different participants.

Further, techniques of the present disclosure may enable a user to utilize multiple cameras of the mobile computing device to broadcast the user's environment to other participants in the virtual collaboration session. The user may, for example, toggle between front and back cameras of the mobile computing device by tapping a thumbnail of the video currently being captured by the active camera.

Example System

FIG. 1 is a conceptual diagram illustrating a server and one or more client devices, which may participate in a virtual collaboration session that enables communication between users, in accordance with one or more aspects of the present disclosure. FIG. 1 includes client devices 20A-20N (collectively, "client devices 20") and server device 5. Client devices 20 include a respective display 25A-25N and a respective communication client 27A-27N, which further include a respective audio/video (AV) module 30A-30N. Communication client 27 may cause display 25 to display graphical user interface (GUI) 40. GUI 40 may further include main participant display 45, thumbnail strip 50 that includes thumbnail images 55 and 60, and user thumbnail 65.

As shown in FIG. 1, server 5 includes communication server 6, communication session 8, and video processing module 10. Each of client devices 20 may be operatively coupled by communication channels 75A-75N, which in some examples may be wired or wireless communication channels capable of sending and receiving data. One example of communication channels 75 may include a Transmission Control Protocol and/or Internet Protocol (TCP/IP) network connection (e.g., using network 15).

Each of client devices 20 may be communicatively coupled to communication session 8 that enables communication between users 70A-70N of client devices 20. Examples of client devices 20 may include, be, or be part of a mobile computing device (e.g., a mobile phone, netbook, laptop, personal digital assistant (PDA), tablet computer, portable gaming device, portable media player, e-book reader, or watch) or other computing devices (e.g., a desktop computer, set top box, or television with one or more processors attached thereto or embedded therein). Each of client devices 20 may be the same or different types of devices. For example, client device 20A and client device 20N may both be mobile phones. In another example, client device 20A may be a mobile phone and client device 20N may be a desktop computer.

Client devices 20 may include communication clients 27. In some examples, communication clients 27 may include mobile or desktop computer applications that provide functionality described herein. Communication clients 27 may include various modules, such as audio/video (AV) module 30A as shown in communication client 27A. Communication clients 27 may exchange audio, video, text, or other information with other communication clients coupled to communication session 8. AV module 30A may cause output device 25A to display GUI 40.

AV module 30A may further include functionality that enables communication client 27A to couple to communication server 6 and join one or more communication sessions (e.g., communication session 8). Two or more client devices (e.g., client device 20A and client device 20N) may join the same communication session 8 to enable communication between the client devices. As described throughout this disclosure a user may "join" a communication session when the communication client of the user's computing device couples (e.g., establishes a connection, to a communication server executing on a server device and/or client device). In some examples, a communication client executing on a computing device joins a communication session by coupling to a communication session managed by a communication server executing on a server device and/or client device.

GUI 40 may include graphical elements such as active participant display 45, thumbnail strip 50, and user thumbnail 65. Graphical elements may include any visually perceivable object that may be displayed in GUI 40. Examples of graphical elements may include a background image, video stream, text, control buttons, input fields, or scroll bars. In one example, AV module 30A may generate a visual representation of user 70A. A visual representation may be a still image or group of images (e.g., a video). Communication client 27A may send the visual representation to communication server 6, which may determine that communication clients 27A and 27N are coupled to communication session 8. Consequently, communication server 6 may send the visual representation of user 70A to communication client 27N as a video stream. Communication client 27N may, upon receiving the visual representation, cause output device 25N to display the video stream. Similarly, client device 20A may receive visual representations of user 70N from communication server 6. That is, communication session 8 may be one example of a communication session. A communication session as used herein is a broad term encompassing as its plain and ordinary meaning, including but not limited to, one or more objects, which may be stored in and/or are executable by hardware, that may enable communication clients (e.g., communication clients 27A and 27N) coupled to the one or more objects to exchange information. The one or more objects may include data, executable instructions, and/or provide functionality of a communication session as described herein.

In addition to exchanging video information, the communication clients 27 may exchange audio, text and other information via communication session 8. For instance, microphones may capture sound at or near each of client devices 20, for example, voices of users 70. Audio data generated by client devices 20 from the sound, may be exchanged between communication clients 27 coupled to communication session 8 of communication server 6. For instance, if user 70A speaks, AV module 30A may receive the sound and convert it to audio data. Communication client 27A may then send the audio data to communication server 6. Communication server 6 may determine communication client 27A is coupled to communication session 8 and further determine that other communication clients are coupled to communication session 8. Upon determining that communication client 27N is coupled to communication session 8, communication server 6 sends the audio data to communication client 27N. In still other examples, text, such a real-time instant messages, or files may be exchanged between communication clients 27 using similar techniques.

As shown in FIG. 1, server 5 includes communication server 6 and communication session 8. Examples of server device 5 may include a personal computer, a laptop computer, a handheld computer, a workstation, a data storage system, a supercomputer, or a mainframe computer. A server device 5 may execute with multiple processors, may have functionality distributed across multiple machines, etc. Server device 5 may also execute as a virtual machine executing on underlying hardware (which itself may be a single or multiple machines). Server device 5 may also execute as a process, or a set of processes, on a cloud server or service. Communication server 6 may generate, manage, and terminate communication sessions such as communication session 8. In some examples, communication server 6 is an application executing on server 5 that performs operations described herein.

In one example, communication server 6 may receive a request to generate communication session 8. For instance, communication client 27A may send a request to communication server 6 that causes communication server 6 to generate communication session 8. Upon generating communication session 8, other communication clients such as communication client 27N, may also couple to communication session 8. For instance, user 70A may cause communication client 27A to send invitations to client device 20N. Upon receiving the invitation, user 70N may cause communication client 27N to send a request to communication server 6 to join communication session 8. Communication server 6, upon receiving the requests, may couple communication client 27N to communication session 8. In other examples, users 70A, 70N may discover communication session 8 by browsing a stream that includes an indicator identifying communication session 8. Users 70A and 70N may similarly join communication session 8 by sending requests to communication server 6.

As described, communication session 8 may enable communication clients coupled to communication session 8 to exchange information. Communication session 8 may include data that, among other things, specifies communication clients coupled to communication session 8. Communication session 8 may further include session information, such as a duration of the communication session, security settings of the communication session, and any other information that specifies a configuration of the communication session. Communication server 6 may send and receive information from communication clients coupled to communication session 8 thereby enabling users participating in the communication session to exchange information.

Communication server 6 may further include optimization module 10. Optimization module 10 may optimize audio and/or video (AV) streams received from client devices 20. In one example, optimization module 10 may combine two or more AV streams into a single combined AV stream. In this example, optimization module 10 may then send the combined AV stream to client devices 20 using communication session 8. In another example, optimization module 10 may combine an AV stream received from one client device 20 with a static representation of another video stream received from another client device 20. In other words, optimization module 10 may combine the AV stream received from one client device 20 with a picture or other still image associated with the AV stream received from the other client device 20 to generate a combined, third AV stream. By combining static representations each associated with a secondary participant with an AV stream associated with a primary participant, the amount of network bandwidth and client device processing resources required may be reduced.

In some examples, optimization module 10 may optimize the AV stream outputted to each client device 20 based on the capabilities of the respective client device 20. For example, optimization module 10 may optimize the AV stream for display on an output device 25A of client device 20A. In one example where client device 20A is a mobile phone and output device 25A is a touchscreen, optimization module 10 may scale one or more dimensions of the combined AV stream to suit the display size of the touchscreen. In this and other examples, optimization module 10 may adjust one or more of the sharpness, brightness, contrast, and hue of the combined AV stream to suit the display capabilities of the touchscreen.

Optimization module 10 may also optimize the AV stream outputted to each client device 20 based on the bandwidth available to the respective client device. For example, where client device 20A is a mobile phone, optimization module 10 may monitor the bandwidth available to client device 20A over communication channel 75B. In this example, optimization module 10 may compare the available bandwidth to a "video threshold". If optimization module 10 determines that the available bandwidth is lower than the video threshold, optimization module 10 may alter the composition of the combined AV stream prior to sending the combined AV stream to client device 20A. In this scenario, optimization module 10 may then generate the combined AV stream by combining static representations of a primary participant and of one or more secondary participants currently participating in communication session 8 in order to reduce the amount of bandwidth required by the AV stream (i.e., to be less than the video threshold amount). In other words, when the amount of available bandwidth drops below a threshold amount of available bandwidth, optimization module 10 may generate a combined AV stream based on still images associated with the primary participant and secondary participants and audio data associated with the primary participant, which may provide a better user experience than the unaltered AV stream.

In some examples, optimization module 10 may compare the available bandwidth of client devices 20 to multiple threshold values, and vary the composition of the combined AV stream accordingly. For example, optimization module 10 may compare the available bandwidth of client device 20A to both the video threshold and a "still image threshold". In some instances, the still image threshold may be a lower value than the video threshold. If optimization module 10 determines that the available bandwidth is lower than the video threshold and higher than the still image threshold, optimization module 10 may generate the combined AV stream by combining static representations of a primary participant and of one or more secondary participants currently participating in communication session 8. If the available bandwidth drops below the still image threshold, optimization module 10 may generate the combined AV stream using only audio data associated with the primary participant. The combined AV stream generated by optimization module 10 may be referred to as an "optimized AV stream."

While participating in communication session 8, client devices 20 may receive the optimized AV stream generated by optimization module 10 using communication clients 27. Client devices 20 may receive the optimized AV streams using respective communication clients 27. Communication clients 27 may also cause respective output devices 25 to display one or more graphical elements associated with the optimized AV stream. In the specific example of FIG. 1, communication client 27A may cause output device 25A to display graphical elements associated with the optimized AV stream and GUI 40.

In the example illustrated in FIG. 1, GUI 40 may include main participant display 45, thumbnail strip 50, thumbnail images 55 and 60, and user thumbnail 65. In one example, client device 20A may receive an optimized AV stream that includes a video stream and an audio stream associated with the main participant, and a still image associated with each of the secondary participants. In this example, main participant display 45 may include the video stream associated with the main participant, thumbnail images 55 and 60 may each include a still image associated with a secondary participant of communication session 8, and user thumbnail 65 may include a still image associated with user 70A.

In another example, client device 20A may receive an optimized AV stream that includes still images associated with each of the main participant and the two secondary participants of communication session 8. In this example, main participant display 45 may include a still image associated with the main participant. In yet another example, client device 20A may receive an optimized AV stream that includes only audio data associated with the main participant. In this example, main participant display 45 and thumbnail images 55 and 60 may each include a blank screen, or a default image that is not associated with the optimized AV stream.

As shown in FIG. 1, communication clients 27 may include respective AV modules 30 that may enable client devices 20 to couple to communication session 8 using communication channels 75 and send visual representations and/or audio data to communication server 8. In one example, AV module 30A may cause client device 20A to capture video data and/or audio data associated with user 70A using one or more cameras and/or microphones of client device 20A. AV module 30A may then generate an audio/video (AV) stream using the video and audio data, and cause communication client to send the AV stream to communication server 6. An AV stream as used herein is a broad term encompassing as its plain and ordinary meaning, including but not limited to, audio and/or video data generated from live capture using one or more input devices, and/or from retrieval of stored data from one or more storage devices.

AV modules 30 may further include functionality to detect one or more characteristics associated with the respective client device 20, and vary the composition of the generated AV streams based on changes in the characteristics. In one example, AV module 30A may include functionality to detect the bandwidth available to client device 20A over communication channel 75B. AV module 30A may then compare the available bandwidth to one or more minimum required available bandwidth thresholds, such as a "client video threshold" and a "client still image threshold." If the available bandwidth is less than the client video threshold but greater than the client still image threshold, AV module 30A may cause communication client 27A to stop generating the AV stream using video data. Instead, AV module 30A may cause communication client 27A to generate the AV stream using a still image and audio data, both associated with user 70A. Similarly, if the available bandwidth drops below the client still image threshold, AV module 30A may cause communication client 27A to generate the AV stream using only audio data associated with user 70A.

In some instances, AV modules 30 may cause output devices 25 to vary the appearance of GUI 40 based on characteristics of AV streams received from communication server 6. In one example, communication server 6 may send an AV stream comprising still images of a main participant and two secondary participants and audio data associated with the main participant to client device 20A. In this example, AV module 30A may cause output device 25A to display GUI 40 such that main participant display 45 includes the still image associated with the main participant. Thumbnail images 55 and 60 may include the still images associated with the secondary participants. In another example, the AV stream may include only audio data associated with the main participant. In this example, AV module 30A may cause main participant display 45 and thumbnail images 55 and 60 to include one or more default images, or to include a blank display.

As shown in FIG. 1, AV module 30A may cause output device 25A to display user thumbnail 65 as part of GUI 40. User thumbnail 65 may include a visual representation of user 70A (e.g., a still image captured by a camera of client device 20A). In some examples, user 70A may select user thumbnail 65 (e.g., by tapping a finger on an area of output device 25A associated with user thumbnail 65) to alter the composition of the AV stream generated by AV module 30A. For example, by selecting user thumbnail 65, user 70A may cause AV module 30A to stop using video captured by a front-facing camera of client device 20A, and start using video captured by a rear-facing camera of client device 20A. In other words, user 70A may "toggle" between two cameras of client device 20A by selecting user thumbnail 65.

GUI 40 may include thumbnail strip 50. In the example of FIG. 1, GUI 40 displays thumbnail strip 50 in a horizontal orientation, above main participant display 45. In another example, GUI 40 may display thumbnail strip 50 in a horizontal orientation below main participant display 45. In other examples, GUI 40 may display thumbnail strip 50 in a vertical orientation, placed along a right side or along a left side of main participant display 45.

Example Device

Figure 2:
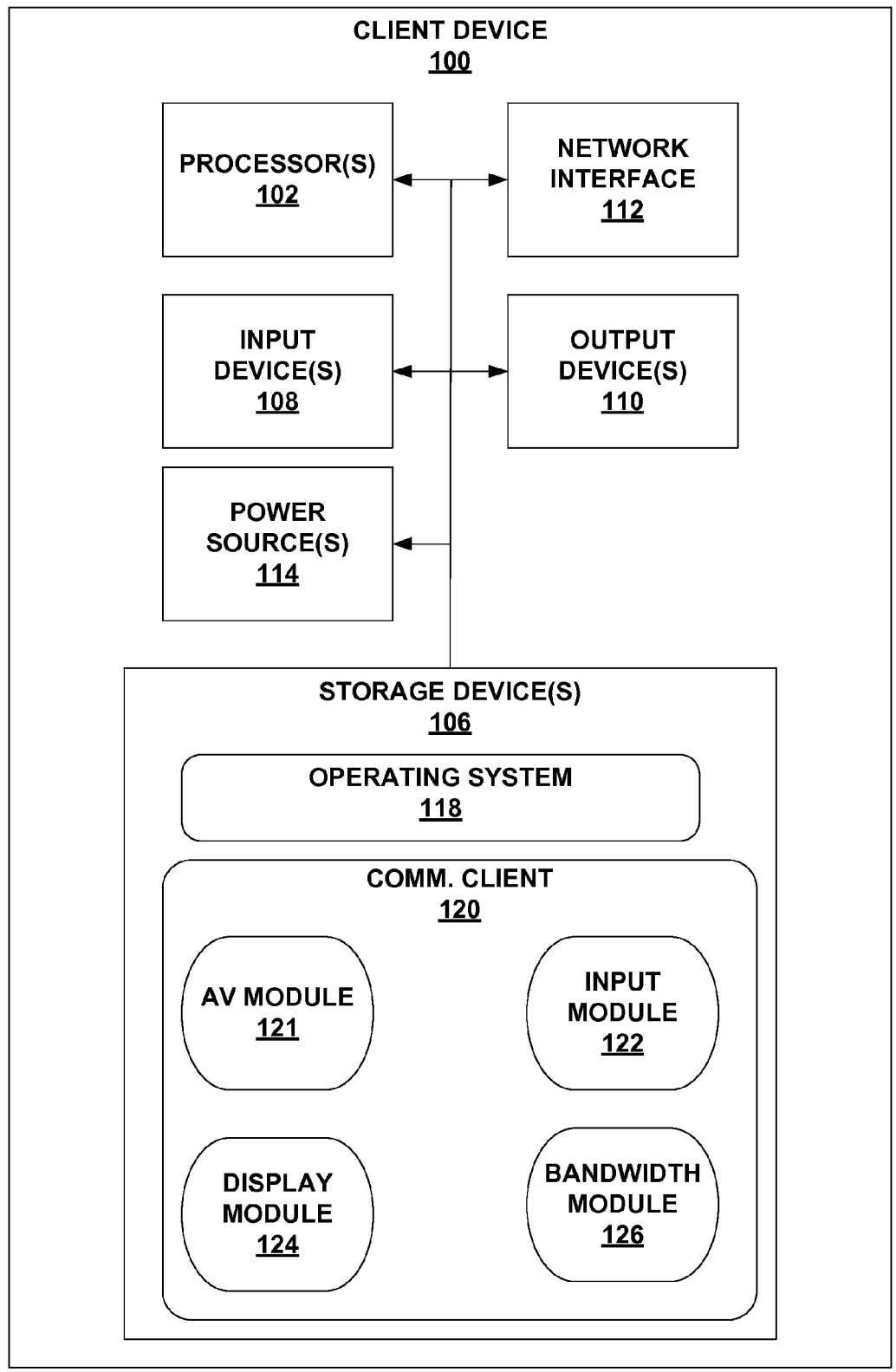
FIG. 2 is a block diagram illustrating details of an example client device shown in FIG. 1, in accordance with one or more aspects of the present disclosure.

FIG. 2 is a block diagram illustrating an example of a client device, in accordance with one or more aspects of the present disclosure. FIG. 2 illustrates an example client device 100, and many other example embodiments may be used in accordance with one or more aspects of this disclosure. As shown in the specific example of FIG. 2, client device 100 may include one or more processors 102, one or more storage devices 106, input devices 108, output devices 110, a network interface 112, and a power supply 114. One or more processors 102 are, in some examples, configured to implement functionality and/or process instructions for execution within client device 100. For example, processors 102 may process instructions stored on storage devices 106. Such instructions may include components of operating system 118, communication client 120, or one or more modules of communication client 120.

One or more storage devices 106, in one example, are configured to store information within client device 100 during operation. Storage device 106, in some examples, is described as a computer-readable storage medium. In some examples, storage device 106 is a temporary memory, meaning that a primary purpose of storage device 106 is not long-term storage. Storage device 106, in some examples, is described as a volatile memory, meaning that storage device 106 does not maintain stored contents when the computer is turned off. Examples of volatile memories include random access memories (RAM), dynamic random access memories (DRAM), static random access memories (SRAM), and other forms of volatile memories known in the art. In some examples, storage device 106 is used to store program instructions for execution by processors 102. Storage device 106, in one example, is used by software or applications running on client device 100 to temporarily store information during program execution.

Storage devices 106, in some examples, also include one or more computer-readable storage media. Storage devices 106 may be configured to store larger amounts of information than volatile memory. Storage devices 106 may further be configured for long-term storage of information. In some examples, storage devices 106 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

As shown in FIG. 2, client device 100 may also include one or more input devices 108. Input devices 108 may be configured to receive input from a user through tactile, audio, video, or biometric channels. Examples of input devices 108 may include a keyboard, mouse, touchscreen, presence-sensitive display, presence-sensitive screen, microphone, one or more still and/or video cameras, fingerprint reader, or any other device capable of detecting an input from a user and relaying the input to client device 100, or components thereof.

Output devices 110 of client device 100, in some examples, may be configured to provide output to a user through visual, auditory, or tactile channels. Output devices 110 may include a video graphics adapter card, a liquid crystal display (LCD) monitor, a light emitting diode (LED) monitor, a cathode ray tube (CRT) monitor, a sound card, a speaker, or any other device capable of generating output that may be intelligible to a user. Output devices 110 may also include a touchscreen, a presence-sensitive display, presence-sensitive screen, or other input/output capable displays known in the art. Presence-sensitive screens and displays may recognize user interactions when an object (e.g., a finger or stylus) is either in direct contact with the presence-sensitive screen, or within a predetermined distance from the presence-sensitive screen. Examples of recognized user interactions may be a click, tap, and swipe (sliding gesture), among others. A user may select an icon, launch an application, invoke menus, or scroll through options using these recognized gestures.

Network interface 112 may facilitate communication between client device 100 and one or more external devices via one or more networks, such as a wireless network. Examples of network interface 112 may include a network interface card, such as an Ethernet card, an optical transceiver, a radio frequency transceiver, or any other type of device than can send and receive information. Other examples of such network interfaces may include Bluetooth®, 3G, and WiFi® radios in mobile computing devices as well as USB. In some examples, client device 100 may utilize network interface 112 to wirelessly communicate with an external device such as server 5 of FIG. 1.

Client device 100, in some examples, may include one or more power sources 114, which may be rechargeable and provide power to client device 100. Power sources 114, in some examples, may be made from nickel-cadmium, lithium-ion, or other suitable material. In other examples, power sources 114 may include one or more of an alternating current (AC) adapter, transformer, converter, inductive charger, or other power-supplying devices known in the art.

Operating system 118 may control one or more functionalities of client device 100 and/or components thereof. For example, operating system 118 may facilitate one or more interactions between audio/video module communication client 120 and one or more of processors 102, storage devices 106, input devices 108, output devices 110, network interface 112, and power sources 114. As shown in FIG. 2, communication client 120 may include audio/video ("AV") module 121, input module 122, display module 124, and bandwidth module 126. Each of input module 122, display module 124, and bandwidth module 126 may include program instructions and/or data that are executable by client device 100. For example, bandwidth module 126 may include instructions that cause communication client 120 executing on client device 100 to perform one or more of the operations and actions described in the present disclosure.

In some examples, one or more of AV module 121, input module 122, display module 124, and bandwidth module 126 may not be part of communication client 120. In these and other examples, one or more of AV module 121, input module 122, display module 124, and bandwidth module 126 may be part of operating system 118. In still other examples, communication module 120 may be part of operating system 118.

AV module 121 may receive, through network interface 112, an audio and/or video stream ("AV stream") from a server, such as server 5 of FIG. 1. AV module 121 may also send an AV stream to the server, using network interface 112. In one example, AV module 121 may cause client device 100 to toggle between using a front-facing camera and a rear-facing camera of input devices 108 to capture video data. In this example, client device 100 may receive a user input from a presence-sensitive screen of input devices 108 (e.g., a user may tap on capture thumbnail 65 shown in FIG. 1). Prior to receiving the user input, client device 100 may capture video data using a front-facing camera of input devices 108. Responsive to receiving the user input, AV module 121 may cause client device 100 to stop the capture using the front-facing camera, and begin capturing video data using a rear-facing camera of input devices 108 responsive to the user input.

As shown in FIG. 2, communication client 120 may include input module 122. Input module 122 may receive, using one or more of input devices 108, audio and/or video data associated with a user operating client device 100. In some examples, input module 122 may receive multiple video streams, where one video stream is captured by a front-facing camera of input devices 108 and another video stream is captured by a rear-facing camera of input devices 108. In these and other examples, input module 122 may receive an audio stream captured by a microphone of input devices 108. Input module 122 may also receive one or more user input using input devices 108. In one example, input module 122 may receive, using a touchscreen of input devices 108, a user input such as a tap gesture. The tap gesture may correspond to an area of the touchscreen associated with a capture thumbnail, or with a thumbnail that represents a participant of the virtual collaboration session. In another example, input module 122 may receive, through a touchscreen of input devices 108, a swipe gesture from a user. The swipe gesture may indicate a request to display a different "landing page" on the display device, and each landing page may be associated with a different participant of the virtual collaboration session.

Communication client 120 of FIG. 2 may also include display module 124. Display module 124 may cause one or more of output devices 110 to display video data to a user who operates client device 100. In one example, display module 124 may cause a touchscreen of output devices 110 to display a graphical user interface ("GUI") to a user. The GUI may include video data associated with a first participant displayed over a majority of the touchscreen, and thumbnail images of all other participants on a remaining portion of the display device. In this example, display module 124 may cause the GUI to switch to displaying a second participant over a majority of the touchscreen, responsive to a user input received by input module 122. The user input may be a tap gesture corresponding to an area of the touchscreen associated with the second participant. Continuing with this example, display module 124 may then cause the GUI to display a thumbnail image associated with the first participant on the remaining portion of the touchscreen.

In another example, display module 124 may cause a presence-sensitive display of output devices 110 to display video data associated with each participant on a separate landing page of the GUI. In this example, display module 124 may cause the GUI to switch from displaying a first landing page to displaying a second landing page responsive to a user input received by input module 122. One such user input may be a swipe gesture performed by a user on the presence-sensitive display. Aspects of landing pages and displaying a new landing page responsive to receiving a swipe gesture are discussed in more detail with respect to FIG. 4 below.

As shown in FIG. 2, communication client 120 may include bandwidth module 126. In some examples, bandwidth module 126 may determine a bandwidth available to client device 100 through network interface 112. In these and other examples, bandwidth module 126 may continually monitor available bandwidth. Bandwidth module 126 may also compare the available bandwidth to a threshold value. In one example, if bandwidth module 126 determines the available bandwidth to be less than the threshold value, bandwidth module 126 may cause AV module to send an AV stream including audio data and a still image to the server using network interface 112. In another example, if bandwidth module 126 determines the available bandwidth to be less than the threshold value, bandwidth module 126 may cause communication client 120 to send an AV stream including only audio stream to the server through network interface.

Example Device

Figure 3:
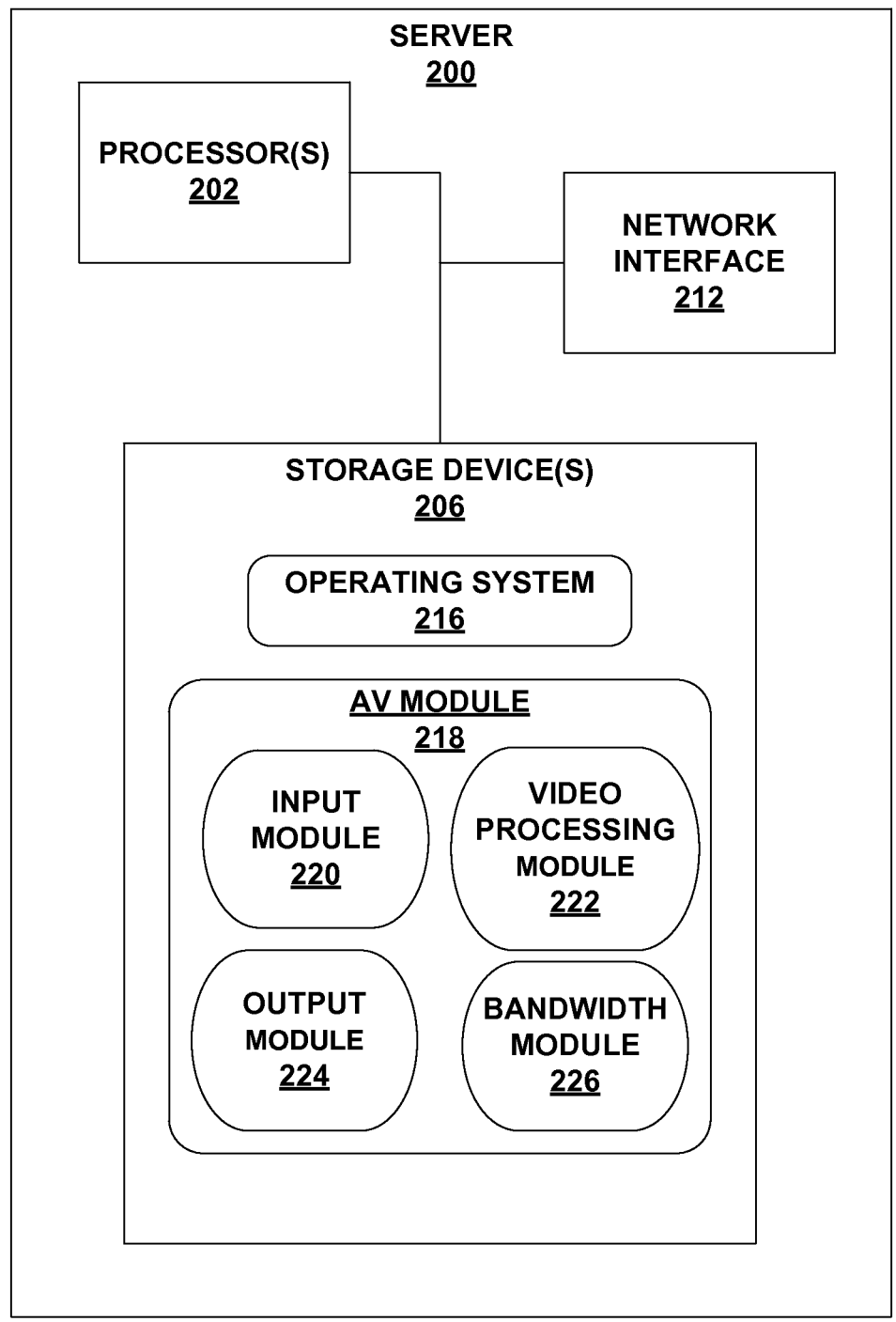
FIG. 3 is a block diagram illustrating details of the example server shown in FIG. 1, in accordance with one or more aspects of the present disclosure.

FIG. 3 is a block diagram illustrating an example of a server, in accordance with one or more aspects of the present disclosure. FIG. 3 illustrates an example server 200, and many other example embodiments a server may be used in other instances. Server 200 may also be an example embodiment of server 5 of FIG. 1.

As shown in FIG. 3, server 200 may include one or more processors 202, one or more storage devices 206, network interface 212, operating system 216, and audio/video (AV) module 218. One or more processors 202 are, in some examples, configured to implement functionality and/or process instructions for execution within server 200. For example, processors 202 may process instructions stored in or instructions stored on storage devices 206. Such instructions may include components of operating system 216, AV module 218, or one or more modules of AV module 218.

One or more storage devices 206, in one example, are configured to store information within server 200 during operation. Storage device 206, in some examples, is described as a computer-readable storage medium. In some examples, storage device 206 is a temporary memory, meaning that a primary purpose of storage device 206 is not long-term storage. Storage device 206, in some examples, is described as a volatile memory, meaning that storage device 206 does not maintain stored contents when the computer is turned off. Examples of volatile memories include random access memories (RAM), dynamic random access memories (DRAM), static random access memories (SRAM), and other forms of volatile memories known in the art. In some examples, storage device 206 is used to store program instructions for execution by processors 202. Storage device 206, in one example, is used by software or applications running on server 200 to temporarily store information during program execution.

Storage devices 206, in some examples, also include one or more computer-readable storage media. Storage devices 206 may be configured to store larger amounts of information than volatile memory. Storage devices 206 may further be configured for long-term storage of information. In some examples, storage devices 206 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Network interface 212 may facilitate communication between server 200 and one or more external devices via one or more networks, such as a wireless network. Examples of network interface 212 may include a network interface card, such as an Ethernet card, an optical transceiver, a radio frequency transceiver, or any other type of device than can send and receive information. Other examples of such network interfaces may include Bluetooth®, 3G, and WiFi® radios in mobile computing devices as well as USB. In some examples, server 200 may utilize network interface 212 to wirelessly communicate with one or more external devices such as client devices 20 of FIG. 1 or client device 100 of FIG. 2.

Operating system 216 may control one or more functionalities of server 200 and/or components thereof. For example, operating system 216 may facilitate one or more interactions between AV module 218 and one or more of processors 202, storage devices 206, and network interface 112. As shown in FIG. 3, AV module 218 may include input module 220, video processing module 222, output module 224, and bandwidth module 226. Each of input module 220, video processing module 222, output module 224, and bandwidth module 226 may include program instructions and/or data that are executable by server 200. For example, bandwidth module 226 may include instructions that cause AV module 218 executing on server 200 to perform one or more of the operations and actions described in the present disclosure.

In some examples, one or more of input module 220, video processing module 222, output module 224, and bandwidth module 226 may not be part of AV module 218. In these and other examples, one or more of input module 220, video processing module 222, output module 224, and bandwidth module 126 may be part of operating system 216. In still other examples, AV module 218 may be part of operating system 118.

As shown in FIG. 3, AV module 218 may include input module 220. Input module 220 may receive, using network interface 212, one or more audio/video (AV) streams from one or more client devices, such as client devices 20 of FIG. 1. In some examples, input module 220 may receive data associated with display capabilities of the one or more client devices. In one such example, input module 220 may cause video processing module 222 to scale an AV stream to suit display capabilities of a client device.

Input module 220 may also receive one or more client requests. Input module 220 may receive the client requests from one or more client devices in a virtual collaboration session, using network interface 212. In one example, input module 220 may receive a client request designating a first participant as a main participant. In this example, input module 220 may cause video processing module 222 to generate an AV stream that includes audio and video data associated with the main participant and a still image of each other participant in the virtual collaboration session.

As shown in FIG. 3, AV module 218 may also include video processing module 222. Video processing module 222 may process video data of the AV streams received by input module 220. In some examples, video processing module 222 may combine video data received from a first client device and a second client device so that a still image associated with video data received from the second client device is placed adjacent to video data received from the first client device. In one such example, video processing module 222 may generate the still image by extracting a single frame from the video data received from the second client device. Video processing module 222 may then generate a "combined AV stream" using the combined video data and audio data associated with the main participant.

Video processing module 222 may also optimize the combined AV stream to suit display capabilities of one or more client devices. In one example, video processing module may receive from input module 220 a display configuration associated with a first client device in the virtual collaboration session. In this example, video processing module 222 may scale one or more dimensions of the combined AV stream based on the display configuration of the first client device. In this and other examples, video processing module 222 may scale a resolution of the combined AV stream based on the display configuration of the first client device. Video processing module 222 may also adjust brightness, contrast, hue, and/or sharpness, convert a frame rate, and/or enhance or diminish detail of the combined AV stream based on the display configuration of the first client device. Display configuration may include one or more of a display resolution, pixel density, refresh rate, luminance, and other display attributes known in the art.

In the example illustrated in FIG. 3, AV module 218 includes bandwidth module 226. Bandwidth module 226 may use network interface 212 to detect bandwidth available to one or more client devices in the virtual collaboration session. In some examples, bandwidth module 226 may compare the available bandwidth of a client device to a threshold value. In one example, if bandwidth module 226 determines that bandwidth available to a client device is less than the threshold value, bandwidth module 226 may cause video processing module 222 to generate the combined AV stream using only audio data associated with the main participant. In another example, bandwidth module 226 may cause video processing module 222 to generate the combined AV stream using audio data and a still image associated with the main participant, and a still image of each other participant in the virtual collaboration session.

In some cases, bandwidth module 226 may compare the available bandwidth to multiple threshold values. For example, bandwidth module 226 may compare the available bandwidth to a "still-image" threshold value and to an "audio-only" threshold value, where the still-image threshold value is greater than the audio-only threshold value. If bandwidth module 226 determines that the available bandwidth is less than the still-image threshold value but greater than the audio-only threshold value, bandwidth module 226 may cause video processing module 222 to generate the combined AV stream using audio data and a still image associated with the main participant, and a still image of each other participant in the virtual collaboration session. If bandwidth module 226 determines that the available bandwidth is less than the audio-only threshold value, bandwidth module 226 may cause video processing module 222 to generate the combined AV stream using only audio data associated with the main participant.

Example Interface

Figure 4A:
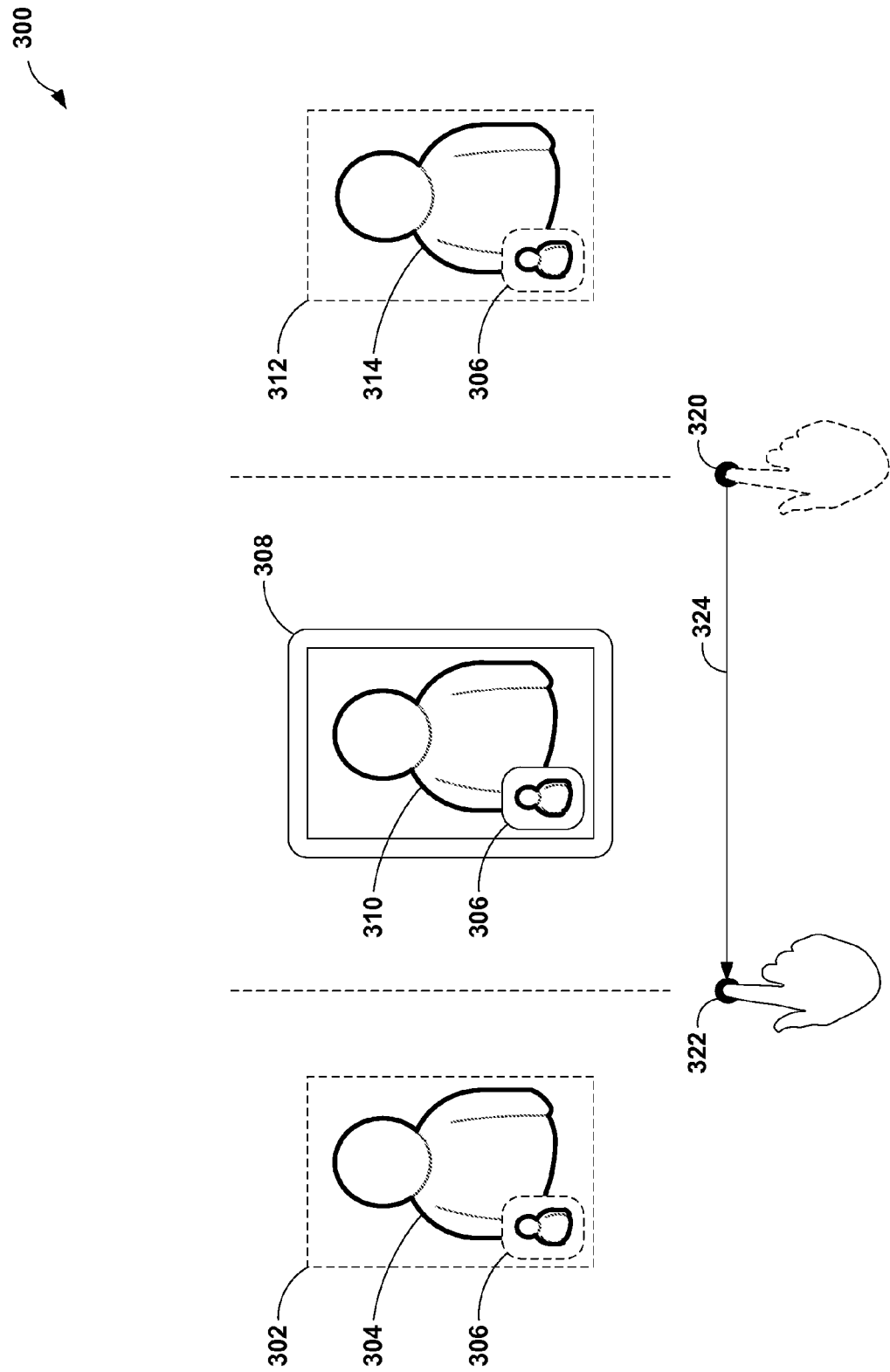
FIGS. 4A & 4B are conceptual diagrams illustrating an example client device that displays different landing pages while the client device participates in a virtual collaboration session, in accordance with one or more aspects of the present disclosure.
Figure 4B:
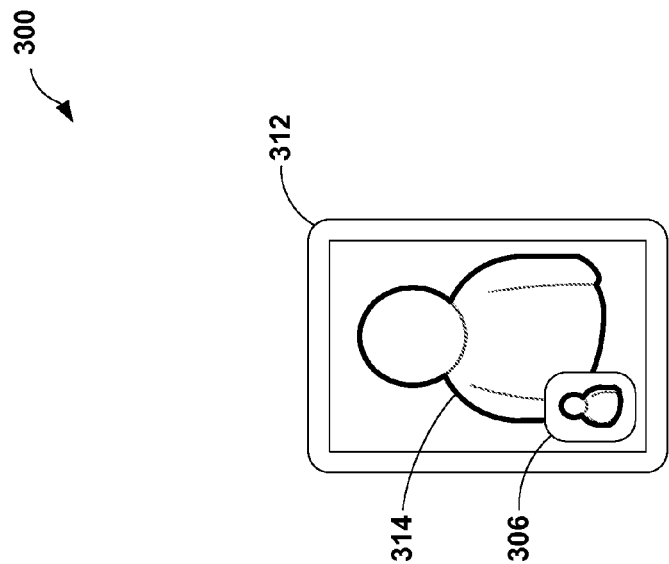
Figure 4B:
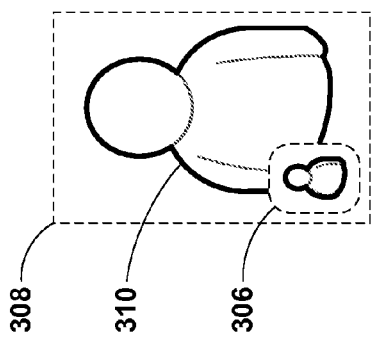
Figure 4B:
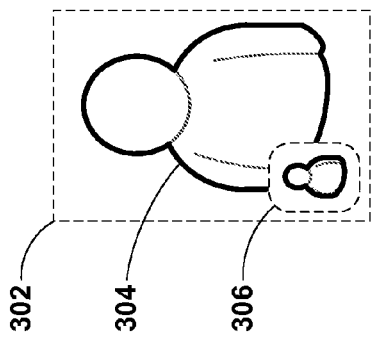

FIGS. 4A & 4B are conceptual diagrams illustrating an example client device that displays different landing pages while the client device participates in a virtual collaboration session, in accordance with one or more aspects of the present disclosure. FIGS. 4A & 4B illustrate an example display device 300 that displays a graphical user interface (GUI). In the example of FIGS. 4A & 4B, a landing page may form a portion of the GUI. A landing page may be associated with a participant in the virtual collaboration session. For example, first landing page 302 may display a visual representation (e.g., video data or a static image) associated with a first participant 304. Similarly, second landing page 308 may display a visual representation associated with a second participant 310, and third landing page 312 may display a visual representation associated with a third participant 314.

In the example of FIG. 4A, second landing page 308 may be considered an "active" landing page, meaning that the GUI of display device 300 currently displays second landing page 308. Conversely, first landing page 302 and third landing page 312 may be considered "inactive" landing pages, as indicated by dashed line borders. An inactive landing page may not be visible to a user viewing display device 300. In the specific example of FIG. 4A, first landing page 302 and third landing page 312 are not visible to a user viewing display device 300. Second participant 310 may be considered a "main participant", since second participant 310 is associated with the active landing page (viz., second landing page 308). Similarly, first participant 304 and third participant 314 may be considered "background participants", as they are associated with inactive landing pages. As second landing page 308 is the active landing page and second participant 310 is the main participant, display device 300 may display a visual representation associated with second participant 310. In one example, the visual representation may comprise video data associated with second participant 310. In another example, the visual representation may comprise a static image associated with second participant 310. In these and other examples, the client device may also output audio data associated with second participant 310.

A user may designate a different main participant by navigating from the active landing page to an inactive landing page. To navigate to an inactive landing page, a user may perform a swipe gesture on display device 300. In the example of FIG. 4A, a user may scroll from second landing page 308 to third landing page 312 by performing swipe gesture 324 along display device 300. To perform swipe gesture 324, the user may begin by placing a finger at a first position 320 on display device 300. The user may then move the finger, while still in contact with display device 300, to second position 322. After completing swipe gesture 324, the user may remove the finger from contact with display device 300, or maintain the contact.

FIG. 4B illustrates the GUI displayed by display device 300 after the user has completed swipe gesture 324. In the example of FIG. 4B, third landing page 312 is the active landing page. Third participant 314 is the main participant, since third participant 314 is associated with the active landing page (i.e., third landing page 312). The GUI of display device 300 may display a visual representation associated with third participant 314. The client device may also output audio associated with third participant 314, as third participant 314 is the main participant. In the example of FIG. 4B, first landing page 302 and second landing page 308 are inactive landing pages, indicated by dashed line borders. First participant 304 and second participant 310 may each be a background participant, as each is associated with an inactive landing page.

In some examples, such as the example of FIGS. 4A-B, each of first landing page 302, second landing page 308, and third landing page 312 may include user thumbnail 306. User thumbnail 306 may include a visual representation associated with the user (e.g., a static image of the user, captured using a camera of the client device). A user may tap (i.e., make brief physical contact) using a finger on the area of display device 300 that is associated with user thumbnail 306. By tapping on user thumbnail 306, the user may cause the client device to toggle between a front-facing camera and a rear-facing camera to capture video data and/or static images associated with the user.

Example Operation(s)

Figure 5:
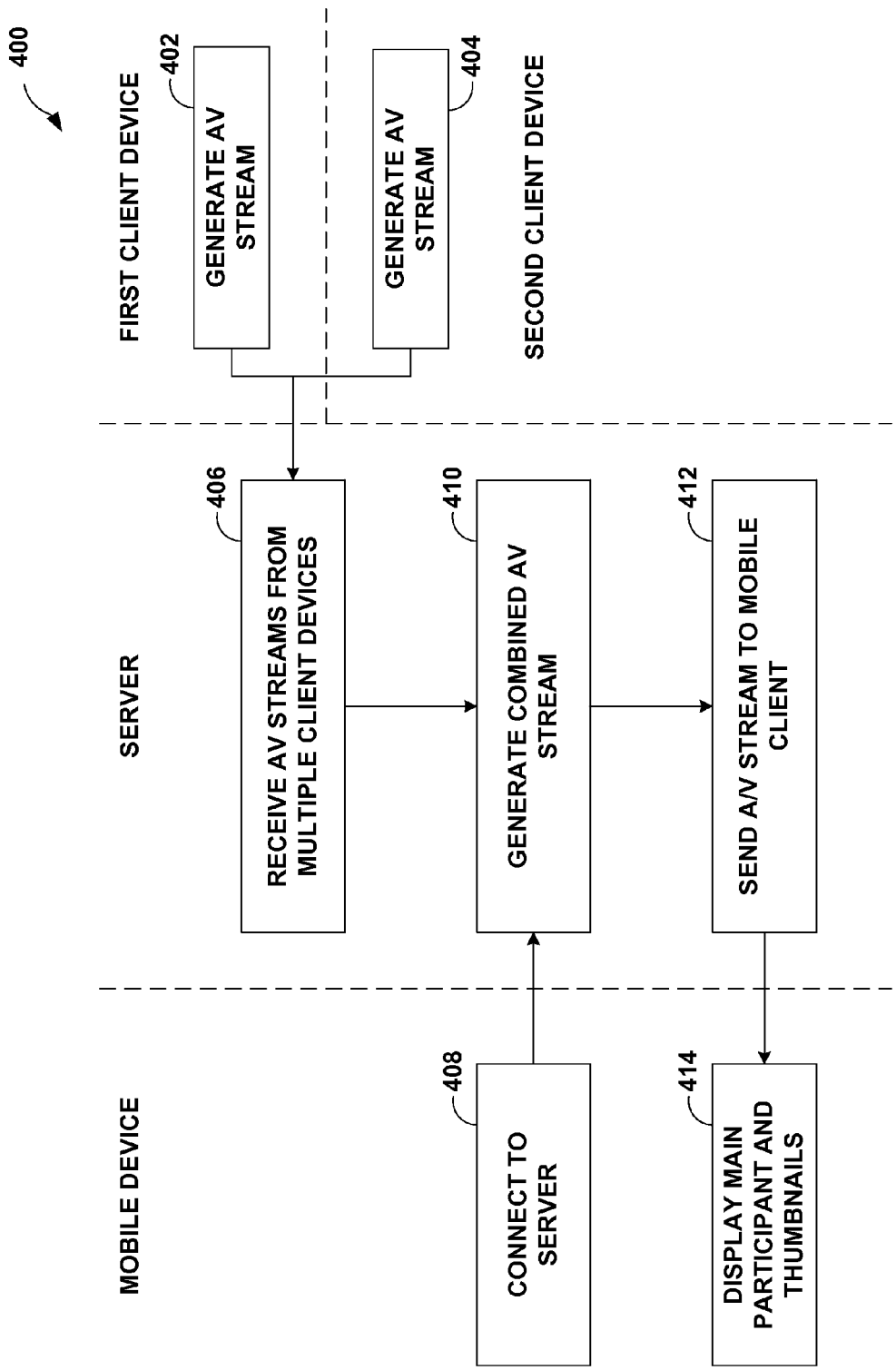
FIG. 5 is a flowchart illustrating an example process by which a mobile computing device, a server, a first client device, and a second client device may interact in a virtual collaboration session, in accordance with one or more aspects of the present disclosure.

FIG. 5 is a flow chart illustrating an example process 400 by which a mobile computing device, a server, a first client device, and a second client device may interact in a virtual collaboration session, in accordance with one or more aspects of the present disclosure. In some non-limiting examples, process 400 may be performed by any combination of devices illustrated in FIGS. 1-4. Process 400 may begin when a first client device generates an AV stream to send to a server (412). At the same or later time, a second client device may generate an AV stream to send to the server (414). The server may then receive the AV stream from the first and second client devices (406). In other examples, the server may receive AV streams from more than two client devices.

Process 400 may then include a mobile computing device connecting to the server using the virtual collaboration session (402). The server may then generate a combined AV stream that includes a visual representation associated with a default main participant and still images (e.g., thumbnails) associated with one or more background participants (408). The main participant and the one or more background participants may be users associated with the first and second client devices. Process 400 may further include superimposing the thumbnails on the visual representation associated with the main participant (408). In some examples, the visual representation may comprise video data associated with the main participant. In other examples, the visual representation may comprise a still image associated with the main participant. In still other examples, the visual representation may comprise text associated with the main participant.

The server may then send the combined AV stream to the mobile computing device through the virtual collaboration session (410). Process 400 may then include the mobile computing device displaying data associated with the combined AV stream to a user of the mobile computing device (404). In the specific example of FIG. 5, the mobile computing device may display a visual representation of the main participant and thumbnails associated with background participants (404). In one example, the thumbnails may form a portion of a thumbnail strip, as discussed earlier with respect to FIG. 1.

Example Operation(s)

Figure 6:
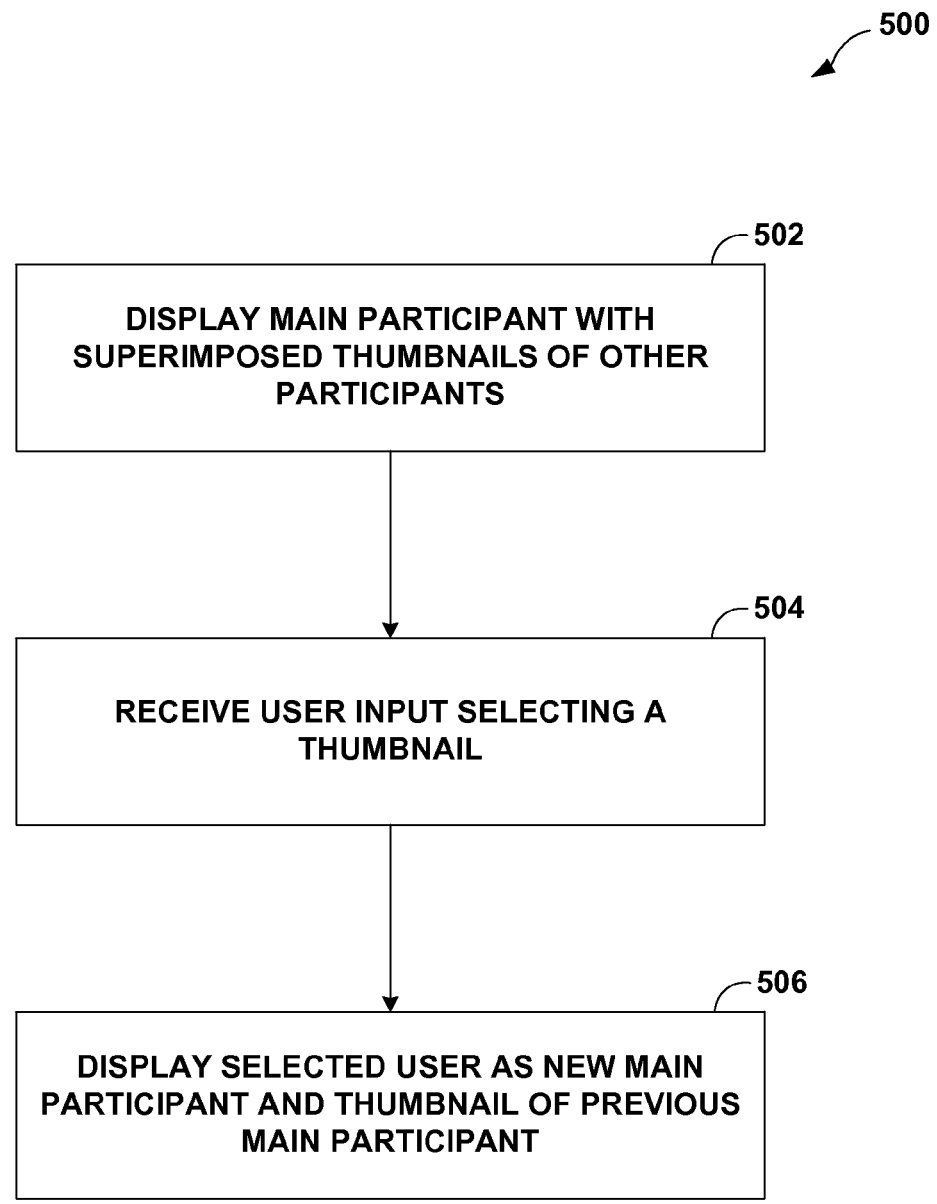
FIG. 6 is a flow chart illustrating an example process by which a device participating in a virtual collaboration session may designate a background participant as a main participant, in accordance with one or more aspects of the present disclosure.

FIG. 6 is a flowchart illustrating an example process 500 by which a mobile computing device in a virtual collaboration session may designate a background participant as a main participant, in accordance with one or more aspects of the present disclosure. Process 500 may begin with a mobile computing device displaying a visual representation of a main participant superimposed with thumbnail images associated with background participants to a user (502). In some examples, the thumbnail images may form a portion of a thumbnail strip, as discussed with respect to FIG. 1. In these and other examples, the mobile computing device may display a capture thumbnail superimposed on the visual representation of the main participant, as discussed with respect to FIGS. 1 & 4.

The mobile computing device may then receive a user input selecting one of the thumbnail images associated with a background participant (504). For example, the mobile computing device may receive a tap gesture from a user, through a presence-sensitive display of the mobile computing device. In this example, the tap gesture may correspond to an area of the display associated with a particular thumbnail image. The mobile computing device may recognize the tap gesture as a user input selecting the particular thumbnail image.

Process 500 may then include the mobile computing device displaying a background user associated with the selected thumbnail image as the main participant (506). At the same or later time, the mobile computing device may display a thumbnail image associated with a background participant who was previously a main participant (506). In one example, a background participant may have been designated as a default main participant, as discussed with respect to FIG. 5. In another example, a background participant may have been selected earlier by the user as a main participant.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause one or more processors to perform one or more of the methods described above. For example, the computer-readable data storage medium may store such instructions for execution by a processor. Any combination of one or more computer-readable medium(s) may be utilized.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

In some examples, any of the described software units, modules or components may be executed as one or more distributed processes on one or more computing devices of a distributed system. In this way, workloads of any of the described software units, modules or components may be distributed across the distributed system for processing. In one example, a distributed system may include multiple autonomous computers that communicate through one or more communication channels, such as a computer network, to perform techniques implemented by the software units, modules or components.

As used throughout this disclosure, headings are included to improve the clarity of the disclosure and are not used to define separate embodiments. In some examples, features of various examples may be combined and/or used from among multiple headings.

Various embodiments have been described. These and other embodiments are within the scope of the following claims.

What is claimed is:

1. A method comprising:
receiving, using one or more computing devices, a first video stream sent from a first client device of a plurality of client devices using a communication session, wherein each of the plurality of client devices is associated with at least one participant;
receiving, using the one or more computing devices, a second video stream sent from a second client device of the plurality of client devices using the communication session, wherein the first client device, the second client device, and the one or more computing devices are each communicatively coupled to the communication session;
receiving, using the one or more computing devices, a request sent from the first client device using the communication session to select the second video stream as a primary video stream;
determining, using the one or more computing devices, whether an amount of bandwidth available to the first client device is less than a first threshold value and a second threshold value, wherein the first threshold value is a video threshold and the second threshold value is a still image threshold; and
providing, using the one or more computing devices, a third video stream based at least on the primary video stream and the secondary video stream to the first client device using the communication session, wherein the third video stream includes the primary video stream, wherein the third video stream is a combined stream based at least on whether the amount of bandwidth available to the first client device is less than the first threshold value and the second threshold value, wherein the communication session allows for a different display or stream from each of the plurality of client devices to be concurrently provided to the first client device, including at least two of: a video stream display, an audio stream, and a still image display, based upon, at least in part, the amount of bandwidth available to the first client device.

2. The method of claim 1, further comprising:
receiving, using the one or more computing devices, from the first client device, a primary audio stream associated with the primary video stream using the communication session;
receiving, using the one or more computing devices, from the second client device, a secondary audio stream associated with the secondary video stream using the communication session;

providing, using the one or more computing devices, the combined stream based at least on the primary audio stream, the secondary audio stream, the primary video stream, and the secondary video stream; and outputting, using the one or more computing devices, the combined stream to the first client device using the communication session.

3. The method of claim 2, further comprising:

determining, using the one or more computing devices, that the amount of bandwidth available to the first client device is less than the first threshold value; and generating, using the one or more computing devices, the combined stream based on the primary audio stream and at least one of a still image associated with the primary video stream and a still image associated with the secondary video stream.

4. The method of claim 3, further comprising:

determining, using the one or more computing devices, that the amount of bandwidth available to the first client device is less than the second threshold value, wherein the second threshold value is less than the first threshold value; and generating, using the one or more computing devices, the combined stream based only on the primary audio stream.

5. The method of claim 1, further comprising:

determining, using the one or more computing devices, the amount of bandwidth available to the first client device; and if the amount of available bandwidth is less than the first threshold value, generating, using the one or more computing devices, the third video stream based on at least one of a still image associated with the primary video and a still image associated with the secondary video stream.

6. The method of claim 1, further comprising:

receiving, using the one or more computing devices from the first client device, a change request that indicates a selection of the second video stream as the primary video stream and the first video stream as the secondary video stream.

7. The method of claim 1, wherein providing the third video stream further comprises:

determining, using the one or more computing devices, a resolution of the primary video stream based at least on display configuration information received from the first client device, wherein the third video stream is generated at the determined resolution.

8. A method comprising:

providing, using a first computing device, a first video stream and a still image associated with a second video stream for display on a presence-sensitive screen of the first computing device, wherein the first computing device and a second computing device are each communicatively coupled to a communication session including a plurality of computing devices, wherein each of the plurality of computing devices is associated with at least one participant, and wherein the first video stream is received from the second computing device using the communication session;

detecting a gesture at the presence-sensitive screen of the first computing device, wherein the gesture corresponds to a selection of the second video stream;

determining, using the first computing device, whether an amount of bandwidth available to the first computing device is less than a first threshold value and a second threshold value, wherein the first threshold value is a video threshold and the second threshold value is a still image threshold; and providing, using the first computing device, based at least on whether the amount of bandwidth available to the first computing device is less than the first threshold value and the second threshold value, the second video stream and a still image associated with the first video stream for display on the presence-sensitive screen, wherein the communication session allows for a different display or stream from each of the plurality of computing devices to be concurrently provided to the first computing device, including at least two of: a video stream display, an audio stream, and a still image display, based upon, at least in part, the amount of bandwidth available to the first computing device.

9. The method of claim 8, further comprising:

responsive to detecting the gesture, sending, to a server comprising one or more computing devices, a request to select the second video stream based at least on the detected gesture, wherein the first computing device and the server are communicatively coupled using the communication session; and receiving, using the first computing device from the server using the communication session, a third video stream that includes the second video stream and the still image associated with the first video stream, wherein the third video stream is a combined stream based at least on whether the amount of bandwidth available to the first computing device is less than the first threshold value and the second threshold value.

10. The method of claim 8, further comprising:

capturing video data with an input device of the first computing device;

sending the video data as a third video stream to a server using the communication session;

detecting, using the first computing device, a second gesture at the presence-sensitive screen;

responsive to detecting a second gesture, capturing second video data with a different second input device of the first computing device; and sending the second video data as the third video stream to the server using the communication session, wherein the third video stream is a combined stream based at least on whether the amount of bandwidth available to the first computing device is less than the first threshold value and the second threshold value.

11. The method of claim 8, further comprising:

capturing audio data using an audio input device of the first computing device;

capturing video data using a video input device of the first computing device; and sending the audio data and the video data as a combined stream to a server, based at least on whether the amount of bandwidth available to the first computing device is less than the first threshold value and the second threshold value, wherein the first computing device and the server are communicatively coupled using the communication session.

12. The method of claim 11, further comprising:

determining that the amount of bandwidth available to the first computing device is less than a threshold value; and sending the audio data but not the third video data as the combined stream to the server using the communication session.

13. A non-transitory computer-readable storage medium comprising instructions for causing at least one processor of one or more computing devices to perform operations comprising:
- receiving a first video stream sent from a first client device of a plurality of client devices using a communication session, wherein each of the plurality of client devices is associated with at least one participant;
- receiving a second video stream sent from a second client device of the plurality of client devices using the communication session, wherein the first client device, the second client device, and the one or more computing devices are communicatively coupled to the communication session;
- receiving a request sent from the first client device using the communication session to select the second video stream as a primary video stream;
- determining whether an amount of bandwidth available to the first client device is less than a first threshold value and a second threshold value, wherein the first threshold value is a video threshold and the second threshold value is a still image threshold; and
- providing a third video stream based at least on the primary video stream and the secondary video stream to the first client device using the communication session, wherein the third video stream includes the primary video stream, wherein the third video stream is a combined stream based at least on whether the amount of bandwidth available to the first client device is less than the first threshold value and the second threshold value, wherein the communication session allows for a different display or stream from each of the plurality of client devices to be concurrently provided to the first client device, including at least two of: a video stream display, an audio stream, and a still image display, based upon, at least in part, the amount of bandwidth available to the first client device.

14. The non-transitory computer-readable storage medium of claim 13, the operations further comprising:
- receiving, using the one or more computing devices from the first client device, a primary audio stream associated with the primary video stream using the communication session; and
- receiving, using the one or more computing devices from the second client device, a secondary audio stream associated with the secondary video stream using the communication session.

15. The non-transitory computer-readable storage medium of claim 14, the operations further comprising:
- determining, using the one or more computing devices, whether the amount of bandwidth available to the first client device is 1) less than the first threshold value and greater than the second threshold value, or 2) less than the second threshold value, wherein the second threshold value is less than the first threshold value; and
- when the amount of bandwidth available to the first client device is less than the first threshold value and greater than the second threshold value, generating the combined audio and video stream based on the primary audio stream and at least one of a still image associated with the primary video stream and a still image associated with the secondary video stream;
- when the amount of bandwidth available to the first client device is less than the second threshold value, generating the combined audio and video stream based only on the primary audio stream.

16. A non-transitory computer-readable storage medium comprising instructions for causing at least one processor of a first computing device to perform operations comprising:
- providing, using the first computing device, a first video stream and a still image associated with a second video stream for display on a presence-sensitive screen of the first computing device, wherein the first computing device and a second computing device are each communicatively coupled to a communication session including a plurality of computing devices, wherein each of the plurality of computing devices is associated with at least one participant, and wherein the first video stream is received from the second computing device using the communication session;
- detecting a gesture at the presence-sensitive screen of the first computing device, wherein the gesture corresponds to a selection of the second video stream;
- determining whether an amount of bandwidth available to the first computing device is less than a first threshold and a second threshold, wherein the first threshold value is a video threshold and the second threshold value is a still image threshold; and
- providing, using the first computing device, based at least on whether the amount of bandwidth available to the first computing device is less than the first threshold value and the second threshold value, the second video stream and a still image associated with the first video stream for display on the presence-sensitive screen, wherein the communication session allows for a different display or stream from each of the plurality of computing devices to be concurrently provided to the first computing device, including at least two of: a video stream display, an audio stream, and a still image display, based upon, at least in part, the amount of bandwidth available to the first computing device.

17. The non-transitory computer-readable storage medium of claim 16, the operations further comprising:
- capturing audio data using an audio input device of the first computing device;
- capturing video data using a video input device of the first computing device; and
- sending the audio data and the video data as a combined stream to a server, based at least on whether the amount of bandwidth available to the first computing device is less than the first threshold value and the second threshold value, wherein the first computing device and the server are communicatively coupled using the communication session.

18. A server comprising one or more computing devices, the one or more computing devices being configured to perform a method of:
- receiving a first video stream sent from a first client device of a plurality of client devices using a communication session, wherein each of the plurality of client devices is associated with at least one participant;
- receiving a second video stream sent from a second client device of the plurality of client devices using the communication session, wherein the first client device, the second client device, and the server are each communicatively coupled to the communication session;
- receiving a request sent from the first client device using the communication session to select the second video stream as a primary video stream;

determining whether an amount of bandwidth available to the first client device is less than a first threshold value and a second threshold value, wherein the first threshold value is a video threshold and the second threshold value is a still image threshold; and providing a third video stream based at least on the primary video stream and the secondary video stream to the first client device using the communication session, wherein the third video stream includes the primary video stream, wherein the third video stream is a combined stream based at least on whether the amount of bandwidth available to the first client device is less than the first threshold value and the second threshold value, wherein the communication session allows for a different display or stream from each of the plurality of client devices to be concurrently provided to the first client device, including at least two of: a video stream display, an audio stream, and a still image display, based upon, at least in part, the amount of bandwidth available to the first client device.

19. The server of claim 18, the method further comprising:

receiving, from the first client device, a primary audio stream associated with the primary video stream using the communication session; and receiving, from the second client device, a secondary audio stream associated with the secondary video stream using the communication session; and providing a combined stream based at least on the primary audio stream, the secondary audio stream, the primary video stream, and the secondary video stream; and outputting the combined stream to the first client device using the communication session.

20. The server of claim 19, the method further comprising:

determining, using the one or more computing devices, that the amount of bandwidth available to the first client device is less than the first threshold value; and generating the combined stream based on the primary audio stream and at least one of a still image associated with the primary video stream and a still image associated with the secondary video stream.

\* \* \* \* \*